M. D. BOLLINGER.
HARROW.
APPLICATION FILED AUG. 4, 1919.

1,355,638. Patented Oct. 12, 1920.

Morgan D. Bollinger INVENTOR

BY

A. D. Macintyre His ATTORNEY

UNITED STATES PATENT OFFICE.

MORGAN D. BOLLINGER, OF SAN JOSE, CALIFORNIA.

HARROW.

1,355,638.

Specification of Letters Patent.   Patented Oct. 12, 1920.

Application filed August 4, 1919. Serial No. 315,368.

*To all whom it may concern:*

Be it known that I, MORGAN D. BOLLINGER, a citizen of the United States, residing at San Jose, in the county of Santa Clara and State of California, have invented a new and useful Harrow, of which the following is a specification.

My invention relates to improvements in harrows and particularly that type of harrow in which a tooth studded harrow body is given horizontal motion other than in the direction of the path of drag, by means of mechanism driven by traction wheels. The invention consists largely in the novelty of the construction, combination and arrangement of the several parts and more particularly in the peculiar motion given to the harrow body. The objects of my improvements are, first, to produce by horizontal motion of the teeth in directions other than that of the path of drag, a more thorough breaking up of the soil harrowed; second, to provide a mechanism, actuated by traction wheels, which will produce the peculiar combination of rotary and reciprocating motion of the harrow body which will best accomplish the object first mentioned; third, to provide a means of raising the harrow body from the ground and disengaging the mechanism from the traction wheels so that the apparatus may be easily moved from place to place.

I attain these objects by the mechanism illustrated in the accompanying drawings, in which—

Figure 1:
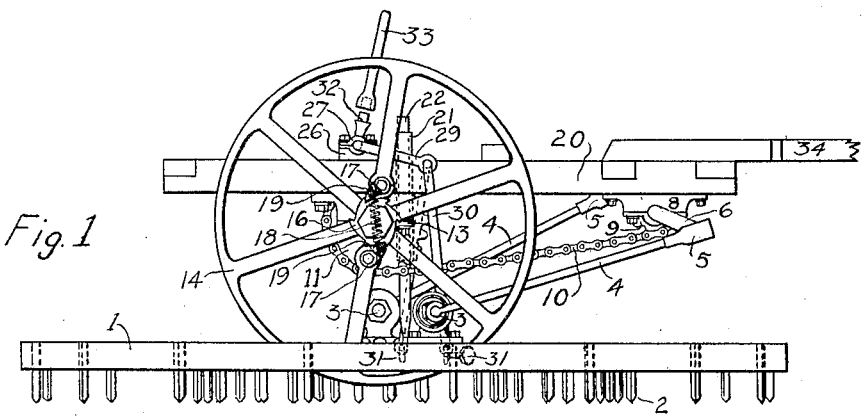
Figure 2:
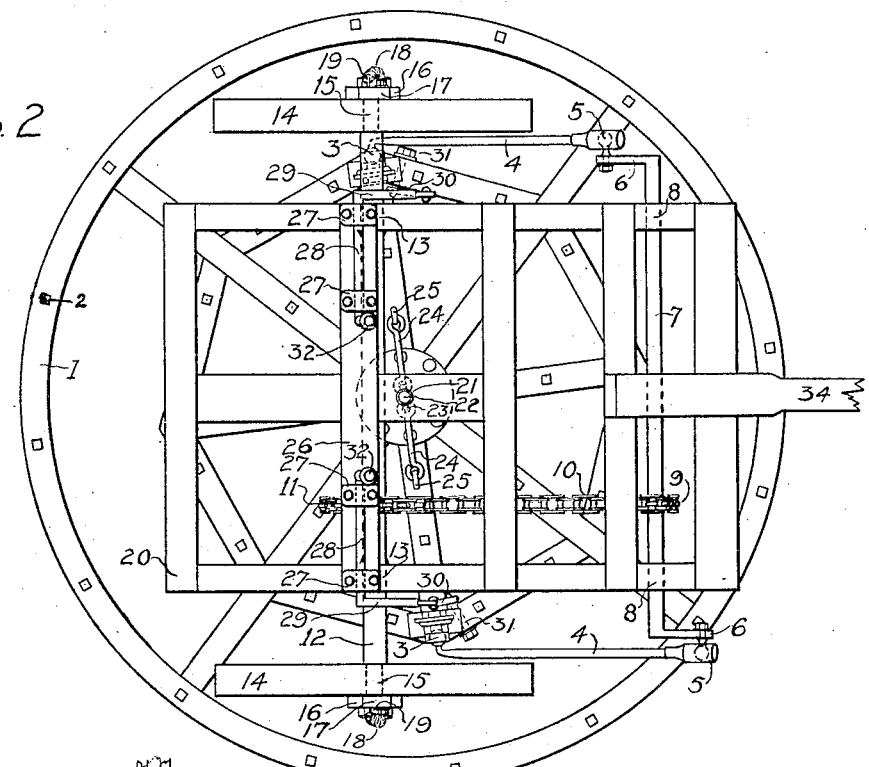
Figure 3:
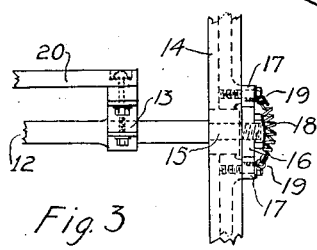

Figure 1 is a vertical elevation of the entire machine; Fig. 2, a plan of the machine; and Fig. 3 a vertical elevation of part of the main axle with details of wheel hub and ratchet.

Similar numerals refer to similar parts throughout the several views.

Resting freely on the ground is the harrow body 1, studded with the teeth 2. On the upper side of the harrow body, at points equidistant from its center, are fastened the ball and socket joints 3, 3, the balls of which are firmly fastened to the reciprocating driving rods 4, 4. At the upper ends of these rods are the ball and socket joints 5, 5, the balls of which are fastened to the cranks 6, 6, which project in opposite directions from and are firmly fastened to the ends of the shaft 7, which revolves in the journals 8, 8.

Attached to the shaft 7 is the sprocket wheel 9, driven by the endless chain 10, with which it meshes. The chain is in turn driven by the sprocket wheel 11, fastened to the main axle shaft 12. The shaft 12 turns in the journals 13, 13 and is supported by the traction wheels 14, 14. These wheels turn freely on their axles 15, 15, each of which has a left hand thread cut in that portion which projects beyond the wheel hub as shown in the detailed view, Fig. 3. The ratchets 16, 16, which are drilled and tapped to fit the left hand thread of the axles are screwed on the axles, and the pawls 17, 17, 17, 17, lock the traction wheels to the ratchets and thus to the shaft 12, when the wheels turn forward and allow of differential action when the vehicle turns. The ends of the coiled springs 18, 18, are hooked into the eyes 19, 19, 19, 19, which are fastened to the pawls, thus holding them in place either engaged with or disengaged from the ratchets.

The journals 13, 13, are fastened to the underside of the frame 20, which they uphold. The journals 8, 8, are likewise fastened to the underside of the frame 20, and are upheld by it. Fastened to, and passing through the frame, is the vertical cylinder 21, in which moves the guide rod 22, which carries at its lower end the eye 23, which is linked to the eye bars 24, 24, which in turn are linked with the eye bolts 25, 25, which are fastened to the harrow body 1.

To the brace 26, which is part of the frame, are fastened the guides 27, 27, 27, 27, in which move the lever rods 28, 28, to which are fastened the levers 29, 29. Linked to these levers are the link rods 30, 30, which are in turn linked to the eye bolts 31, 31, which are bolted to the harrow body 1. At the opposite ends of the lever rods are the lever lugs 32, 32. To either of these lugs may be attached the lever handle 33, by means of which either side of the harrow body 1, may be raised from the ground.

The pole 34 may be fastened to the frame 20. Now when the harrow is pulled or drawn about, over plowed ground, either by horses or by a tractor, the traction wheels 14, 14, will turn and through the pawls 17, 17, 17, 17, and ratchets 16, 16, will rotate the axle shaft 12, which will in turn cause the shaft 7, to rotate by means of the chain 10, and sprocket wheels 9 and 11. The revolving cranks 6, 6, will drive the reciprocating rods 4, 4, and through them the harrow body 1, will be given an oscillating motion about its center, and the teeth 2, will describe zig-zag paths, thus harrowing and cross-harrowing the soil.

The guide rod 22 allows the harrow body 1 to move freely in all directions necessary to harrow and conform to the surface of the ground, but prevents any lateral motion which would interfere with the traction wheels. By means of the guide rod 22, also, the entire harrow body 1, may be raised free from the ground, and if fastened in this position and the pawls 17, 17, 17, 17 locked open, the machine may be wheeled about at will without operating.

While I have shown and described in detail one method of securing the desired result, I do not wish to confine myself to the particular details shown and described, as they may be varied in many ways without departing from the spirit of the invention.

I am aware that prior to my invention, harrows consisting of a harrow body studded with teeth and attached to some sort of a frame for propulsion, and provided with mechanism to give it horizontal motion, have been made. I therefore do not claim such a combination broadly; but—

I claim:

1. A harrow comprising a tooth studded harrow body, resting on the ground, traction wheels supporting a frame, a means of locking the traction wheels to their axles when moving forward, two cranks set 180 degrees apart and driven by gearing from the axle shaft, two reciprocating driving rods, each connected at one end to one of the said cranks and at the other end to one of two ball and socket joints fastened to the harrow body near points opposite its center.

2. A harrow comprising a tooth studded harrow body, resting on the ground, traction wheels supporting a frame, ratchets and pawls for locking the traction wheels to their axles when moving forward but allowing them to rotate freely backward, an auxiliary shaft geared to the main shaft by chain and sprocket wheels, journals supporting both axle shaft and auxiliary shaft, two cranks set 180 degrees apart and fastened rigidly to the opposite ends of the auxiliary shaft, two driving rods, one end of each connected by ball and socket joint to one of said cranks and the other end to one of two ball and socket joints fastened to the harrow body near points opposite its center.

3. A harrow comprising a tooth studded harrow body resting on the ground, traction wheels, a frame supported thereby, a vertical guide cylinder fastened to the frame, a guide rod sliding loosely in the guide cylinder and with its lower end linked to the harrow body.

MORGAN D. BOLLINGER.

Witnesses:
A. D. MACINTYRE,
R. D. BOLLINGER.